US007162271B2

United States Patent
Kermalli

(10) Patent No.: US 7,162,271 B2
(45) Date of Patent: Jan. 9, 2007

(54) BAND PASS FILTER AND METHOD OF FILTERING FOR A BASE STATION IN A WIRELESS COMMUNICATION SYSTEM

(75) Inventor: Munawar Hussein Kermalli, Floral Park, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 374 days.

(21) Appl. No.: 10/183,379

(22) Filed: Jun. 28, 2002

(65) Prior Publication Data

US 2004/0002361 A1    Jan. 1, 2004

(51) Int. Cl.
*H04M 1/00*   (2006.01)
(52) U.S. Cl. .................... 455/561; 455/339; 455/552.1
(58) Field of Classification Search ............... 455/69, 455/73, 67.13, 114.2, 115.1, 339, 340, 561, 455/307, 552.1, 562.1; 370/342
See application file for complete search history.

(56) References Cited

U.S. PATENT DOCUMENTS

| | | | | |
|---|---|---|---|---|
| 3,626,301 A | * | 12/1971 | Develet, Jr. ................. | 455/260 |
| 4,422,047 A | * | 12/1983 | Wright ........................ | 455/73 |
| 5,548,825 A | * | 8/1996 | Maemura et al. ......... | 455/115.1 |
| 5,802,110 A | * | 9/1998 | Watanabe et al. ............. | 455/69 |
| 6,023,488 A | * | 2/2000 | White ........................ | 370/342 |
| 6,029,052 A | * | 2/2000 | Isberg et al. ................ | 455/131 |
| 6,349,218 B1 | * | 2/2002 | Nakagawa et al. ....... | 455/562.1 |
| 6,396,823 B1 | * | 5/2002 | Park et al. .................. | 455/561 |
| 2005/0003853 A1 | * | 1/2005 | Burgt ...................... | 455/552.1 |

* cited by examiner

Primary Examiner—Quochien B. Vuong

(57) ABSTRACT

The band pass filter includes at least first and second band pass filters. A selector receives at least one signal, and supplies the signal to one of the first and second band pass filters. A controller controls the selector based on a frequency of the signal.

14 Claims, 2 Drawing Sheets

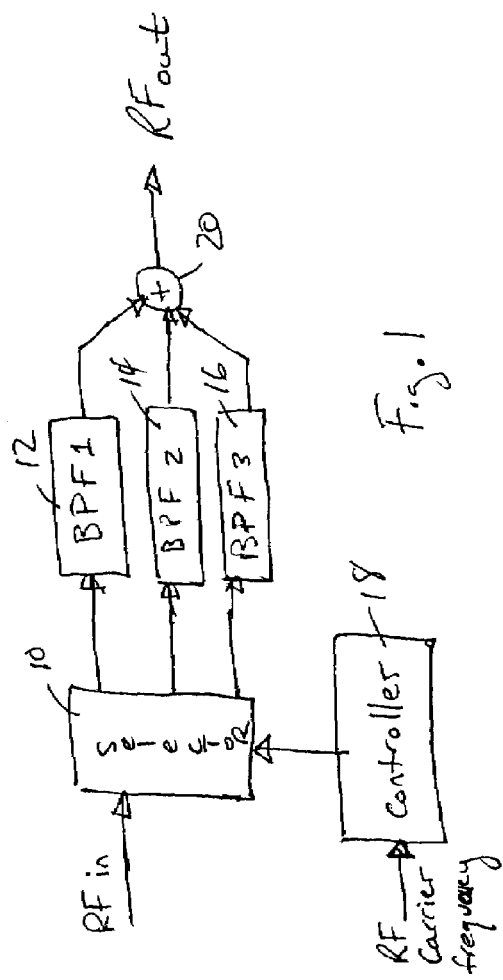
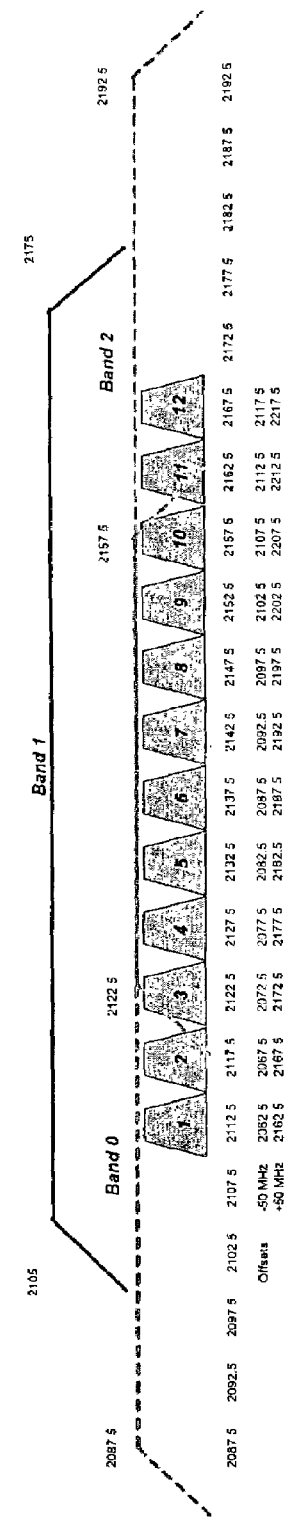

| | 1 | 2 | 3 | 4 | 5 | 6 | 7 | 8 | 9 | 10 | 11 | 12 |
|---|---|---|---|---|---|---|---|---|---|---|---|---|
| Single Carries | 1 | 2 | 3 | 4 | 5 | 6 | 7 | 8 | 9 | 10 | 11 | 12 |
| Two carries | 1,2 | 2,3 | 3,4 | 4,5 | 5,6 | 6,7 | 7,8 | 8,9 | 9,10 | 10,11 | 11,12 | |
| Three carries | 1,2,3 | 2,3,4 | 3,4,5 | 4,5,6 | 5,6,7 | 6,7,8 | 7,8,9 | 8,9,10 | 9,10,11 | 10,11,12 | | |
| Filter Band | Band 0 | | | | Band 1 | | | | Band 2 | | | |

Fig. 3

BAND PASS FILTER AND METHOD OF FILTERING FOR A BASE STATION IN A WIRELESS COMMUNICATION SYSTEM

BACKGROUND OF THE INVENTION

1. Field of the Invention

The present invention relates to wireless communication, and more particularly, a band pass filter and method of filtering for a base station in a wireless communication system.

2. Description of Related Art

The current evolution in wireless networking is being driven by the increasing demand for high bandwidth mobile applications, such as the mobile internet. The resulting trends in development of hardware and software are posing a need for significant reduction in cost, size, and power consumption of base station transceivers (BTS). Consequently, innovations in BTS designs are expected to contribute to a substantial reduction of size and cost.

One such method to achieve these reductions is to change the architecture of the RF transmitter. Instead of the conventional heterodyne architecture (multistage up conversion), a direct conversion architecture offers a simplified and smaller design at a lower cost by eliminating IF (intermediary frequency) based components.

Because of the simplified architecture, a common design can be used across different frequency platforms, such as UMTS, PCS and Cellular. This would further reduce the cost in producing a radio transmitter.

However, because of process technologies, there is a limitation on the achievable noise output at the direct conversion modulator. Any noise produced by the modulator would directly end up at the transmitter output. If the transmitter was always sending out the same carrier frequency, a band pass filter could be used to reduce the noise floor outside the pass band.

A typical BTS, however, has to be able to transmit signals over different frequencies. For example, the TX (transmission) band in UMTS applications is 2110 to 2170 MHz. Furthermore, there is a stringent requirement for UMTS on the noise output 50 MHz away from the center of a transmitted signal. A signal being transmitted at 2110 MHz would need a much different filter than one that is being transmitted at 2170 MHz to meet the spurious noise requirements of UMTS.

SUMMARY OF THE INVENTION

The present invention provides selectable band pass filtering with N band pass filters, where each filter covers a different portion of a transmitted frequency spectrum. For UMTS in particular, N is 3 and the bandwidth of each filter is 70 MHz. This allows up to three UMTS carriers occupying 15 MHz of bandwidth to have a minimum predistortion bandwidth of 55 MHz. This would allocate at least 20 MHz of spectrum on each side of the 15 MHz transmitted signal for predistortion components that is necessary to linearize the third order components of the high power transmitter amplifier.

A controller selects the appropriate band pass filter depending on the frequency of the carriers being transmitted. The selected filter then attenuates the noise floor of the direct conversion modulator in the band of interest such that the overall BTS spurious emissions requirement is achieved.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 1 illustrates a band pass filter architecture according to one embodiment of the present invention;

FIG. 2 illustrates the transmission frequency spectrum for a base station in UMTS; and FIG. 3 illustrates a look up table used by the controller of FIG. 1 in deciding which band pass filter to select.

DETAILED DESCRIPTION OF THE EMBODIMENTS

FIG. 1 illustrates an embodiment of the band pass filter according to the present invention for use in a UMTS base station. As shown, a selector 10 receives at least one RF signal to filter from, for example, a direct conversion modulator (not shown), and outputs the RF signal or signals to one of three different band pass filters 12, 14, and 16 based on a control signal received from a controller 18. The controller 18 generates the control signal based on the frequency or frequencies of the RF signal or signals. A summer 20 then sums the output of the three band pass filter 12, 14 and 16, and outputs the summation result for transmission.

The band pass architecture of FIG. 1 forms part of the base station, in which each RF signal is generated and the frequency thereof is known. Because the components generating an RF signal and frequency thereof are so well-known, they have not been illustrated in FIG. 1 for the sake of clarity.

FIG. 2 illustrates the transmission frequency spectrum of a UMTS base station. As shown, the transmission frequency spectrum is divided into twelve 5 MHz blocks, each block for handling a communication channel. Accordingly, an RF signal will have a carrier frequency associated with one of the twelve 5 MHz blocks. FIG. 2 also illustrates the pass band of the first, second and third band pass filters 12, 14 and 16. As shown, the pass band Band 0 of the first band pass filter 12 is from 2087.5–2157.5 MHz, the pass band Band 1 of the second band pass filter 14 is from 2105–2175 MHz, and the pass band Band 2 of the third band pass filter 16 is from 2122.5–2192.5 MHz.

In generating the RF signals for transmission, the RF signals take up no more than one contiguous 15 MHz block of transmission frequency spectrum. FIG. 3 illustrates a table showing the possible groupings of RF signals when one, two or three RF signals are transmitted. The controller 18 stores the table of FIG. 3 as a look up table. When the controller 18 receives the frequency or frequencies of the RF signal (e.g., the 5 MHz block number), the controller 18 accesses the table to determine the pass band, and therefore which band pass filter to select. As shown, the table associates the RF signal carrier frequencies (one, two or three carriers) with a particular pass band—Band 0, Band 1 or Band 2. For example, when a single RF signal is being transmitted and the controller 18 receives a "4" indicating that the carrier frequency corresponds to the 5 MHz band labeled "4" in FIG. 2, the controller 18 obtains Band 0 as the pass band from the look up table illustrated in FIG. 3. As another example, if the controller 18 receives 4, 5, and 6 as the carrier frequencies of three RF signals being transmitted, then the controller 18 obtains Band 1 as the pass band from the look up table illustrated in FIG. 3.

The controller 18 then causes the selector 10 to select the one of the first, second and third band pass filters 12, 14 and 16 having the obtained the pass band. As a result, the RF signal is filtered by the selected band pass filter. Because the selected band pass filter has a pass band with a center frequency closest to the average carrier frequency of the RF signals being transmitted, the stringent out of band noise requirement for a communications transmitter is met.

The summer 20 sums the outputs of the first, second and third band pass filters 12, 14 and 16, and outputs the summation result for transmission.

While the present invention has been described for a UMTS base station, it will be appreciated that the present invention is applicable to different frequency platforms, such as PCS and Cellular. The number of band pass filters are not limited to that described above, and the size of the pass bands are not limited to that described above. Instead, the number of band pass filters and the size of the individual pass bands will depend on the size of the transmission frequency spectrum and the desire noise requirements. Also, the pass bands of the filters are not limited to being equal. Furthermore, the present invention is not limited to the example look up table illustrated in FIG. 3. For instance, different frequency platforms may allow less than three or more than three RF signals to be transmitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A band pass filter for a base station in a wireless communication system, comprising:
   at least first and second band pass filters;
   a selector receiving more than one signal with different carrier frequencies at a same time and supplying the signals to one of the first and second band pass filters; and
   a controller controlling the selector based on a combination of frequencies of the more than one signal received at the same time.

2. The band pass filter of claim 1, wherein the controller controls the selector to select the one of the first and second band pass filters having a pass band with a center frequency closest to a center frequency of an average of the frequencies of the more than one signal received at the same time.

3. The band pass filter of claim 2, wherein the first and second band pass filters have a 70 MHz pass band, and each signal has a frequency spectrum of no more than 15 MHz.

4. The band pass filter of claim 1, wherein
   the controller includes a look up table that maps frequencies to one of the first and second band pass filters; and
   the controller receives the combination of the frequencies of the more than one signal received at the same time, obtains the one of the first and second band pass filters from the look up table using the combination of the frequencies of the more than one signal received at the same time, and controls the selector to supply the signals to the obtained band pass filter.

5. The band pass filter of claim 1, further comprising:
   a third band pass filter; and wherein
   the selector supplies the signals to one of the first, second and third band pass filters.

6. The band pass filter of claim 1, further comprising:
   a summer summing output of the first and second band pass filters.

7. The band pass filter of claim 1, wherein
   the selector receives three RF signals at the same time; and
   the controller controls the selector based on the combination of frequencies of the three RF signals.

8. A band pass filter for a base station in a wireless communication system, comprising:
   first, second and third band pass filters;
   a selector receiving more than one signal with different carrier frequencies at the same time and supplying the signals to one of the first, second and third band pass filters; and
   a controller controlling the selector to select the one of the first, second and third band pass filters having a pass band with a center frequency closest to a center frequency of a combination of frequencies of the more than one signal received at the same time.

9. The band pass filter of claim 8, wherein the controller includes a look up table that maps frequencies to one of the first, second and third band pass filters, the controller receives the frequencies of the signals at the same time, obtains the one of the first, second and third band pass filters from the look up table using the combination of the frequencies of the more than one signal received at the same time, and controls the selector to supply the signals to the obtained band pass filter.

10. A method of filtering signals for transmission by a base station in a wireless communication system, comprising:
    receiving more than one signal with different carrier frequencies at the same time for transmission;
    selecting a filter pass band based on a combination of frequencies of the more than one signal received at the same time; and
    filtering the signals using a band pass filter with the selected pass band.

11. The method of claim 10, wherein the selecting step selects a filter pass band, from a group of at least two filter pass bands, having a center frequency closest to a center frequency of an average of the frequencies of the more than one signal received at the same time.

12. The method of claim 11, wherein the selectable filter pass bands have a pass band of 70 Mhz, and each signal has a frequency spectrum of no more than 15 MHz.

13. The method of claim 10, wherein the selecting step comprises:
    obtaining a filter pass band from a look up table using the combination of frequencies of the more than one signal received at the same time.

14. The method of claim 10, wherein
    the receiving step receives three RE signals at the same time; and
    the selecting step selects the filter pass band based on a combination of frequencies of the three RF signals received at the same time.

* * * * *